US010145475B2

(12) United States Patent
Kito et al.

(10) Patent No.: US 10,145,475 B2
(45) Date of Patent: Dec. 4, 2018

(54) MECHANICAL SEAL DEVICE

(71) Applicants: EAGLE INDUSTRY CO., LTD., Minato-ku, Tokyo (JP); EAGLEBURGMANN JAPAN CO., LTD., Minato-ku, Tokyo (JP)

(72) Inventors: Masakazu Kito, Tokyo (JP); Hiroshi Tanaka, Tokyo (JP)

(73) Assignees: EAGLE INDUSTRY CO., LTD. (JP); EAGLEBURGMANN JAPAN CO., LTD. (JP)

( * ) Notice: Subject to any disclaimer, the term of this patent is extended or adjusted under 35 U.S.C. 154(b) by 0 days.

(21) Appl. No.: 15/521,610

(22) PCT Filed: Oct. 27, 2015

(86) PCT No.: PCT/JP2015/080219
§ 371 (c)(1),
(2) Date: Apr. 24, 2017

(87) PCT Pub. No.: WO2016/072318
PCT Pub. Date: May 12, 2016

(65) Prior Publication Data
US 2017/0241548 A1    Aug. 24, 2017

(30) Foreign Application Priority Data
Nov. 4, 2014    (JP) .................................. 2014-224147

(51) Int. Cl.
*F16J 15/34*    (2006.01)
(52) U.S. Cl.
CPC ................................ *F16J 15/3464* (2013.01)
(58) Field of Classification Search
CPC ...... F16J 15/3464; F16J 15/441; F16J 15/164; B63H 23/321
See application file for complete search history.

(56) References Cited

U.S. PATENT DOCUMENTS 3,746,349 A    7/1973   Smale ............................ 277/382
4,509,762 A *  4/1985   Garrett ................. F16J 15/3464
                                                         277/372
(Continued)

FOREIGN PATENT DOCUMENTS

CN    101313163    11/2008    ............... F16J 15/34
CN    102405365    4/2012     ............... F16J 15/34
(Continued)

OTHER PUBLICATIONS

Notification of Transmittal of Translation of the International Preliminary Report on Patentability (PCT/IB/338) dated May 18, 2017, with International Preliminary Report on Patentability (PCT/IB/373) and Written Opinion of the International Searching Authority (PCT/ISA/237), for corresponding international application PCT/JP2015/080219.

(Continued)

*Primary Examiner* — Eugene G Byrd
(74) *Attorney, Agent, or Firm* — Hayes Soloway P.C.

(57) ABSTRACT

A mechanical seal device has a mating ring that rotates with a rotating shaft, as well as a seal ring that slidably contacts the mating right, so as to seal between the rotating shaft and a seal cover fixed to an equipment main body, wherein the seal cover is a split structure comprising at least an inner-diameter-side seal cover and an outer-diameter-side seal cover, the inner-diameter-side seal cover is detachably connected to the outer-diameter-side seal cover, and the seal ring is connected to the inner-diameter-side seal cover in a securely following manner.

7 Claims, 5 Drawing Sheets

(56) References Cited

U.S. PATENT DOCUMENTS

| | | | | |
|---|---|---|---|---|
| 5,067,733 A | * | 11/1991 | Nagai | F16J 15/3488 277/370 |
| 5,114,160 A | * | 5/1992 | Ootsuka | F16J 15/3404 277/408 |
| 5,658,127 A | | 8/1997 | Bond | 277/399 |
| 5,722,671 A | | 3/1998 | Nosowicz | 277/408 |
| 6,224,061 B1 | * | 5/2001 | Roddis | F16J 15/3464 277/361 |
| 6,325,382 B1 | | 12/2001 | Iwamoto | 277/368 |
| 8,011,668 B2 | * | 9/2011 | Roddis | F16J 15/38 277/408 |
| 8,800,995 B2 | | 8/2014 | Suefuji | F16J 15/342 |
| 9,845,888 B2 | * | 12/2017 | Furukawa | F16J 15/3464 |
| 2001/0045701 A1 | | 11/2001 | Toal | 277/370 |
| 2002/0047239 A1 | * | 4/2002 | Auber | F16J 15/3464 277/358 |
| 2003/0042683 A1 | | 3/2003 | Takahashi | 277/370 |
| 2004/0173971 A1 | | 9/2004 | Kudari | 277/361 |
| 2004/0212154 A1 | | 10/2004 | Yada | 277/512 |
| 2006/0263207 A1 | * | 11/2006 | Manninen | F16J 15/3464 415/170.1 |
| 2009/0174149 A1 | | 7/2009 | Takahashi | 277/370 |
| 2009/0200749 A1 | | 8/2009 | Teshima | 277/512 |
| 2009/0302546 A1 | | 12/2009 | Takahashi | 277/408 |
| 2010/0032907 A1 | | 2/2010 | Anderberg | 277/306 |
| 2010/0308543 A1 | * | 12/2010 | Huang | F16J 15/3464 277/511 |
| 2011/0175297 A1 | * | 7/2011 | Fesl | F16J 15/3464 277/358 |
| 2011/0198813 A1 | | 8/2011 | Takahashi | 277/387 |
| 2012/0013076 A1 | * | 1/2012 | Takahashi | F16J 15/363 277/391 |
| 2012/0013077 A1 | | 1/2012 | Takahashi | |
| 2012/0099984 A1 | * | 4/2012 | Abarca Melo | F04D 29/126 415/229 |
| 2012/0187636 A1 | | 7/2012 | Suefuji | 277/387 |
| 2012/0201673 A1 | * | 8/2012 | Aoike | F16J 15/3404 415/229 |
| 2012/0267860 A1 | * | 10/2012 | Sato | F16J 15/3464 277/358 |
| 2013/0223782 A1 | | 8/2013 | Mandou | 384/481 |

FOREIGN PATENT DOCUMENTS

| | | | |
|---|---|---|---|
| CN | 103821942 | 5/2014 | F16J 15/34 |
| DE | 102007002644 | 7/2008 | |
| GB | 2351536 A | 1/2001 | |
| JP | S52156858 U | 11/1977 | |
| JP | H0659668 | 8/1994 | |
| JP | 2003074713 | 3/2003 | F16J 15/34 |
| WO | 2010116844 A1 | 10/2010 | |

OTHER PUBLICATIONS

International Search Report (ISR), dated Dec. 8, 2015, issued for International application No. PCT/JP2015/080219.

Chinese Office Action (w/translation) issued in application No. 201580058486.7, dated Dec. 29, 2017 (9 pgs).

International Search Report (ISR), dated Dec. 8, 2015, issued for International Patent Application Serial No. PCT/JP2015/080218 (14 pgs).

Notification of Transmittal of translation of the International Preliminary Report on Patentability dated May 18, 2017 and Written Opinion for related International Patent Application Serial No. PCT/JP2015/080218 (11 pgs).

Office Action issued in U.S. Appl. No. 15/521,609, dated Jul. 11, 2018 (19 pgs).

* cited by examiner

[FIG. 1]
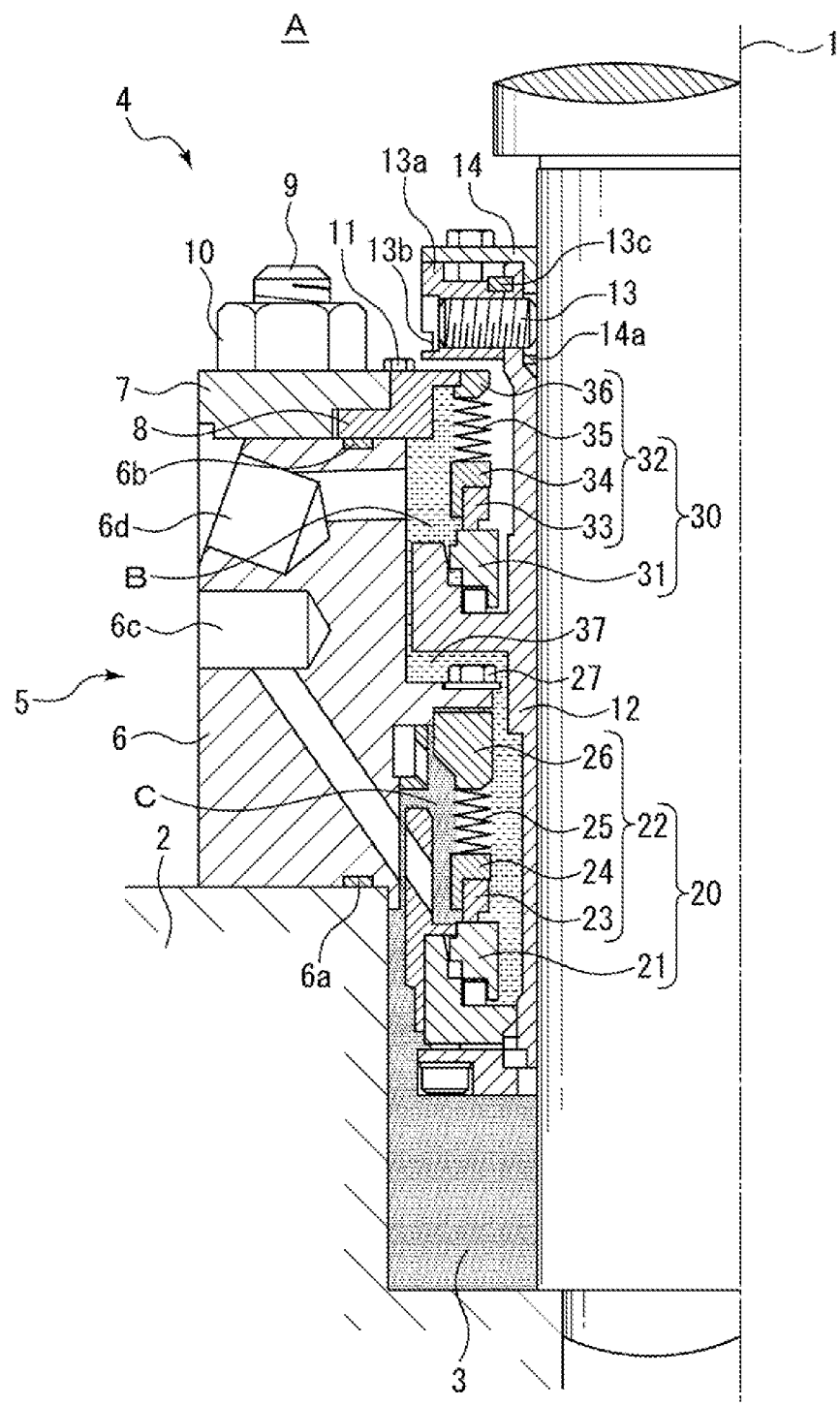

[FIG. 2]
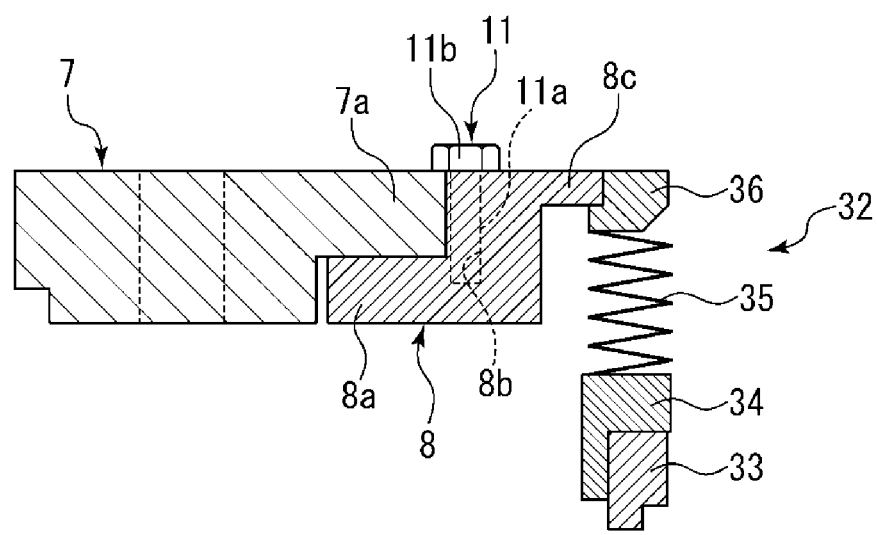
[FIG. 3]
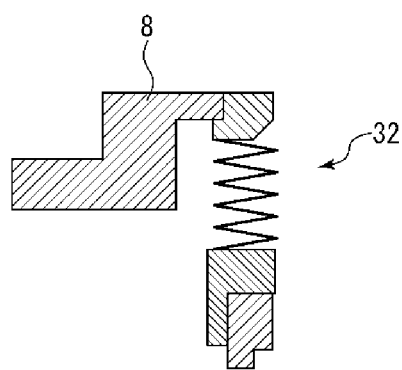

[FIG. 4]
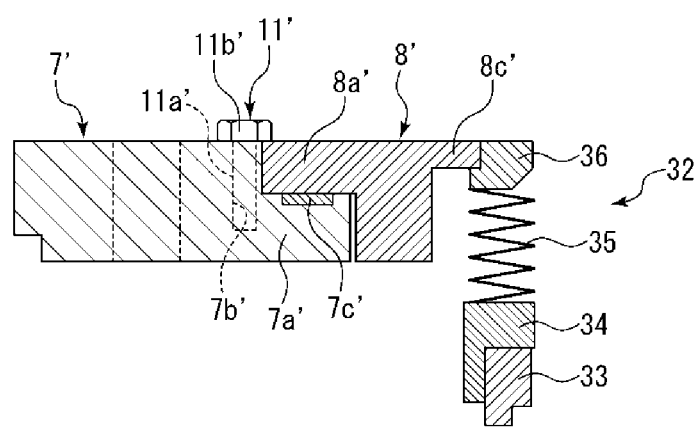

[FIG. 5]
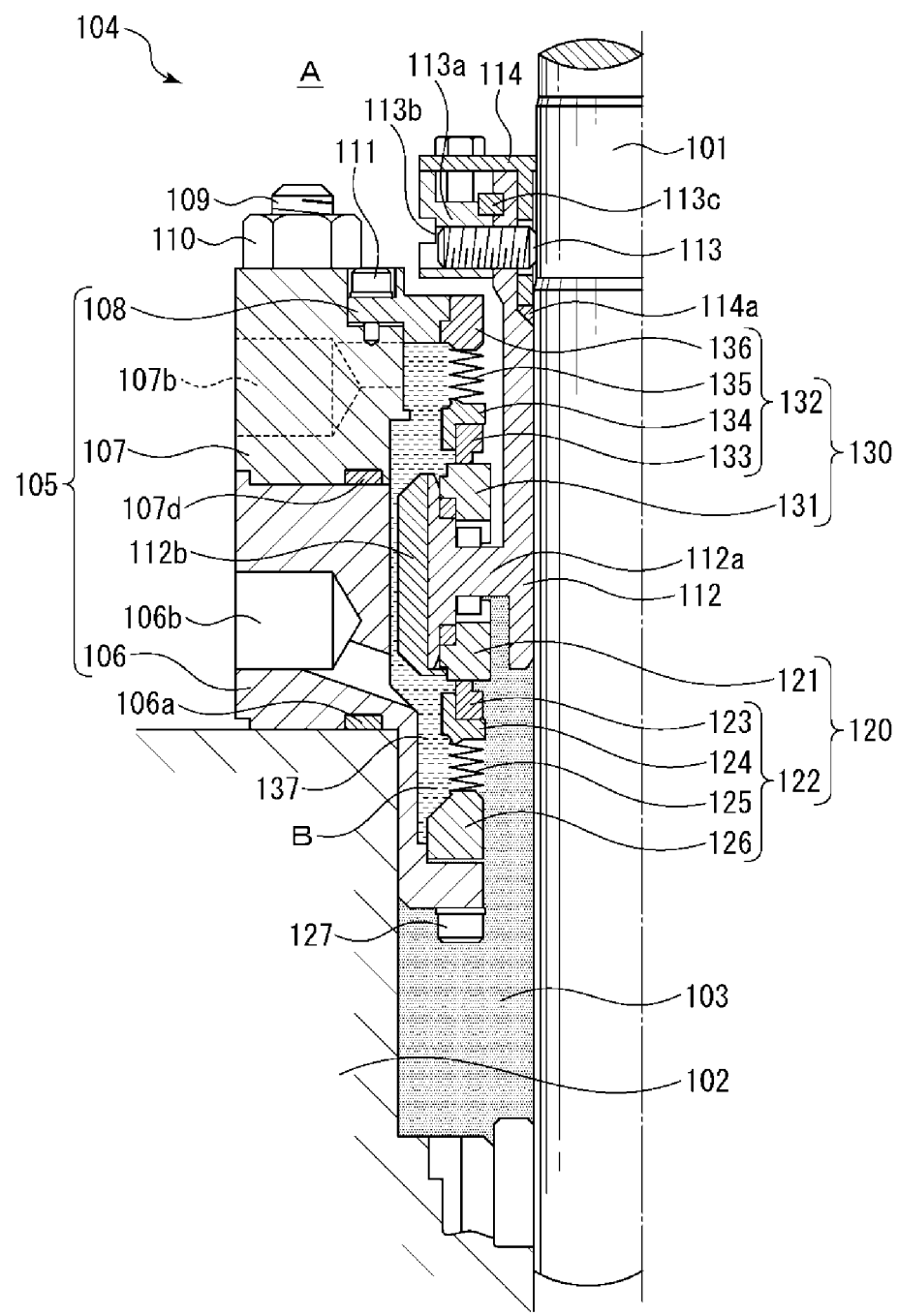

[FIG. 6]
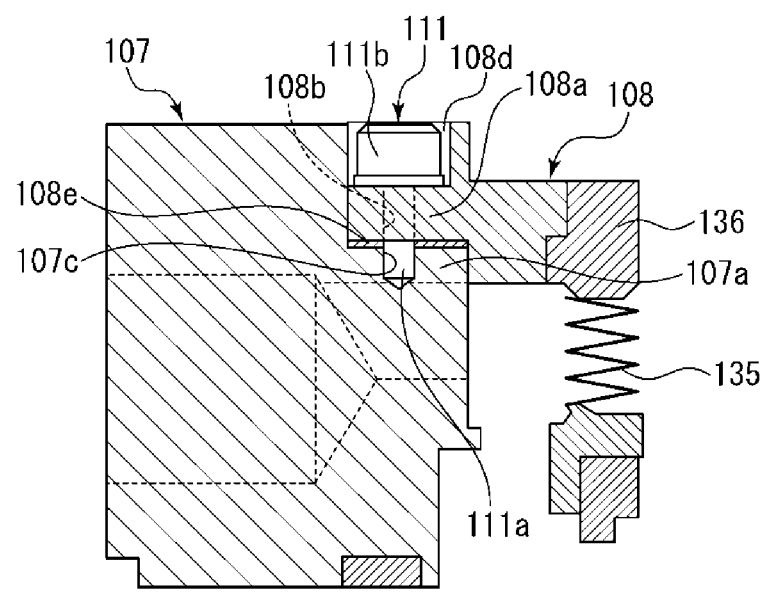
[FIG. 7]
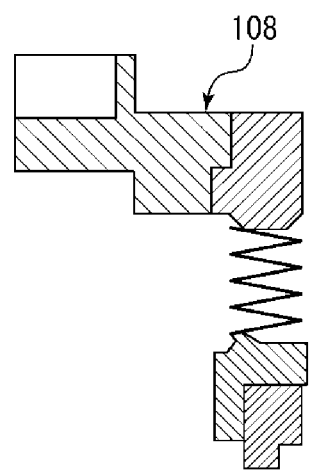

MECHANICAL SEAL DEVICE

This application is the U.S. National Phase under 35 U.S.C. § 371 of International Application PCT/JP2015/080219, filed Oct. 27, 2015, which claims priority to Japanese Patent Application No. 2014-224147, filed Nov. 4, 2014. The International Application was published under PCT Article 21(2) in a language other than English.

TECHNICAL FIELD

The present invention relates to a mechanical seal device used as an axial seal for rotating equipment in chemical, food, general industry and other applications.

BACKGROUND ART

A traditional bellows-type mechanical seal device has a seal ring held on a retainer which is fixed to a bellows, and an opposing mating ring that slidably contacts the seal ring, wherein the seal ring is supported on a seal cover via the retainer, bellows, and an adapter, and the mating ring is supported on a rotating shaft and rotates with the rotating shaft (refer to Patent Literature 1, for example).

BACKGROUND ART LITERATURE

Patent Literature

Patent Literature 1: International Patent Laid-open No. 2010/116844 (Paragraph 0016, FIG. 1)

SUMMARY OF THE INVENTION

Problems to Be Solved by the Invention

With the mechanical seal device described in Patent Literature 1, the retainer, bellows, adapter, and seal cover constituting the fixed-side seal assembly are fixed to each other by means of welding, etc. And, the seal cover is fixed to an equipment main body via bolts and nuts. When correcting the sliding contact surface of the seal ring or performing other maintenance, therefore, the bolts and nuts fixing the seal cover to the equipment main body must be unfastened and the fixed-side seal assembly must be removed in the axial direction together with the seal cover before the maintenance can be performed.

However, the seal cover removed at the time of maintenance is structured in such a way that it covers the seal ring or other seal element in the radial direction and axial direction of the rotating shaft and is therefore considerably large in the radial direction and axial direction and heavy, which gives rise to the problem of difficulty handling the seal ring, etc., during maintenance as it is connected to the seal cover via the bellows, etc. This problem is particularly noticeable with mechanical seal devices used for large equipment.

The present invention was conceived from recognizing this problem, and its object is to provide a mechanical seal device with improved seal cover structure that achieves excellent ease of handling the seal ring or other seal element during maintenance.

To achieve the aforementioned object, the mechanical seal device proposed by the present invention has:

a mating ring that rotates with a rotating shaft, as well as an opposing seal ring that slidably contacts the mating ring, so as to seal between the rotating shaft and a seal cover fixed to an equipment main body;

wherein such mechanical seal device is characterized in that the seal cover is a split structure comprising at least an inner-diameter-side seal cover and an outer-diameter-side seal cover, the inner-diameter-side seal cover is detachably connected to the outer-diameter-side seal cover, and the seal ring is connected to the inner-diameter-side seal cover in a securely following manner.

According to this characteristic, the seal ring is connected to the inner-diameter-side seal cover in a securely following manner, and the inner-diameter-side seal cover is detachably connected to the outer-diameter-side seal cover, so by removing the seal ring from the outer-diameter-side seal cover together with the inner-diameter-side seal cover, maintenance of the seal ring, etc., can be performed on the connection piece which has a small outer shape, is lightweight, and offers excellent ease of handling.

Another characteristic is that the seal cover is a three-part split structure comprising at least the inner-diameter-side seal cover, outer-diameter-side seal cover, and an axial-direction seal cover, the inner-diameter-side seal cover, outer-diameter-side seal cover, and axial-direction seal cover are each detachably connected, and a feed hole is provided in the axial-direction seal cover through which fluid is fed from the outside into the space where the seal ring is placed.

According to this characteristic, there is no need to form a feed hole in the inner-diameter-side seal cover or in the outer-diameter-side seal cover, which makes it possible to form the outer-diameter-side seal cover and inner-diameter-side seal cover small and lightweight, resulting in greater ease of handling the seal covers during maintenance.

Another characteristic is that a flange is formed on the inner-diameter-side seal cover, and the inner-diameter-side seal cover is fixed to the outer-diameter-side seal cover by a fixing means in a state where this flange is abutting the inner side of the outer-diameter-side seal cover in the axial direction.

According to this characteristic, the pressure acting upon the inner-diameter-side seal cover from the inner side of the mechanical seal device is primarily received by the outer-diameter-side seal cover via the flange of the inner-diameter-side seal cover, which effectively prevents the inner-diameter-side seal cover from separating from the outer-diameter-side seal cover.

Another characteristic is that the fixing means is a coupling bolt with head which is installed on the inner-diameter-side seal cover, from the outer side in the axial direction, at a position on the inner diameter side of the outer-diameter-side seal cover, and a part of the head of the coupling bolt abuts the outer-diameter-side seal cover.

According to this characteristic, there is no need for a hole, etc., in the outer-diameter-side seal cover through which to connect the coupling bolt, which simplifies the structure of the fixing means.

Another characteristic is that the fixing means provides fixing in which the flange of the inner-diameter-side seal cover is sandwiched between the outer-diameter-side seal cover and axial-direction seal cover in the axial direction.

According to this characteristic, the inner-diameter-side seal cover is sandwiched between the outer-diameter-side seal cover and axial-direction seal cover in the axial direction and this improves the fixed strength of the inner-diameter-side seal cover.

BRIEF DESCRIPTION OF THE DRAWINGS

FIG. 1 Section view of the mechanical seal device in Example 1.

FIG. 2 Section view of the mechanical seal device in FIG. 1, showing a state where the outer-diameter-side and inner-diameter-side seal covers are removed.

FIG. 3 Section view of the seal cover in FIG. 2, showing a state where the inner-diameter-side seal cover is removed.

FIG. 4 Section view of the mechanical seal device in Example 2.

FIG. 5 Section view of the mechanical seal device in Example 3.

FIG. 6 Section view of the mechanical seal device in FIG. 5, showing a state where the outer-diameter-side and inner-diameter-side seal covers are removed.

FIG. 7 Section view of the seal cover in FIG. 5, showing a state where the inner-diameter-side seal cover is removed.

MODE FOR CARRYING OUT THE INVENTION

Modes for carrying out a mechanical seal device pertaining to the present invention are explained below based on examples.

Example 1

The mechanical seal device pertaining to Example 1 is explained by referring to FIGS. 1 to 3. In the explanations below, the relative directional terms such as "top" and "bottom" refer to those defined in the drawings of FIGS. 1 to 3 and do not necessarily represent the top and bottom of the mechanical seal device after being installed, while the terms "inner side" and "outer side" refer to the sealed fluid side and atmosphere side of the mechanical seal device represent the inner side and outer side, respectively.

A mechanical seal device 4 is of the so-called tandem type, where a primary-side mechanical seal 20 and secondary-side mechanical seal 30 are used to axially seal between a rotating shaft 1 extending in the vertical direction and a seal cover 5 enclosing the rotating shaft 1. A pump impeller (not illustrated) housed in an equipment main body 2 is fixed to the bottom of the rotating shaft 1. The seal cover 5 is fixed to the equipment main body 2 by a bolt 9 and nut 10 and encloses the rotating shaft 1 in the axial direction and radial direction.

The seal cover 5 is formed by an axial-direction seal cover 6 which is fixed to the equipment main body 2 with the bolt 9 and nut 10 via a gasket 6a, and an outer-diameter-side seal cover 7 and inner-diameter-side seal cover 8 which are connected to the end of the axial-direction seal cover 6 and seal in the radial direction. These seal covers 6, 7, 8 are formed by stainless steel, aluminum alloy, or other metal.

As shown in FIG. 2, the outer-diameter-side seal cover 7 has a circular cutout at the bottom on the inner diameter side, and also has a circular projection 7a formed at the top which projects toward the inner diameter side. The inner-diameter-side seal cover 8 has a circular cutout at the top on the outer diameter side, and also has a circular projection 8a (flange) formed at the bottom which projects toward the outer diameter side. When the projection 7a of the outer-diameter-side seal cover 7 is aligned in position with the cutout in the inner-diameter-side seal cover 7, the outer-side surface of the outer-diameter-side seal cover 7 becomes roughly flush with that of the inner-diameter-side seal cover 8. When a male thread 11a of a coupling bolt 11 (fixing means) is caused to be screwed to a female thread 8b of the inner-diameter-side seal cover 8, the projection 7a is sandwiched between a head 11b of the coupling bolt 11 and the projection 8a and is thus fixed in place.

When a bolt (not illustrated) is fastened via a gasket 6b in a state where the outer-diameter-side seal cover 7 and inner-diameter-side seal cover 8 are coupled as one piece by the coupling bolt 11, the outer-diameter-side seal cover 7 and inner-diameter-side seal cover 8 are fixed to the axial-direction seal cover 6. The inner-diameter-side seal cover 8 is sandwiched between the projection 7a of the outer-diameter-side seal cover 7 and the top of the axial-direction seal cover 6.

A setscrew 13 screwed with the female thread of a circular sleeve 13a fitting to a sleeve 12, so that the tip of the setscrew 13 abuts the outer periphery surface of the rotating shaft 1 and the sleeve 12 does not rotate but remains fixed. The circular sleeve 13a is restrained by a split ring 13c from moving outward in the axial direction. A sleeve collar 14 presses a gasket 14a against the end face of the sleeve 12 to seal along the rotating shaft 1. The primary-side mechanical seal 20 comprises: a mating ring 21 which is closely fitted and fixed via a retainer to the bottom outer periphery of the sleeve 12 and rotates with the rotating shaft 1; a fixed-side seal ring 23 that slidably contacts the mating ring 21; a retainer 24 that holds the seal ring 23 in place; a bellows 25 which is welded and fixed to the retainer 24 and adds bias force in the axial direction; and an adapter 26 whose one end is welded and fixed to the bellows 25 and other end is fixed by a bolt 27 to the bottom surface of the circular projection projecting toward the inner diameter side of the axial-direction seal cover 6. It should be noted that the seal ring 23, retainer 24, bellows 25, and adapter 26 constitute a fixed-side seal assembly 22.

The secondary-side mechanical seal 30 comprises: a mating ring 31 which is closely fitted and fixed to the center outer periphery of the sleeve 12 and rotates with the rotating shaft 1; a fixed-side seal ring 33 that slidably contacts the mating ring 31; a retainer 34 that holds the seal ring 33 in place; a bellows 35 which is welded and fixed to the retainer 34 and adds bias force in the axial direction; and an adapter 36 whose one end is welded and fixed to the bellows 35 and other end is welded and fixed, along its outer periphery, to the inner periphery of the inner-diameter-side seal cover 8. It should be noted that the seal ring 33, retainer 34, bellows 35, and adapter 36 constitute a fixed-side seal assembly 32. In other words, the fixed-side seal assembly 32 is connected to the inner-diameter-side seal cover 8 in a securely following manner.

The primary-side mechanical seal 20 seals a liquid or gas 3 in the pump chamber (not illustrated) present below it, and this liquid or gas 3 is partly transferred to an outer periphery space C of the primary-side mechanical seal 20 and circulated back therefrom toward the pump chamber side through a flushing drain hole 6c (feed hole) in the axial-direction seal cover 6 for flushing. This way, the sealed sliding surface of the primary-side mechanical seal 20 is lubricated/cooled.

Also, external liquid 37 is sealed in an interim chamber B between the primary-side mechanical seal 20 and secondary-side mechanical seal 30, filling the chamber to its top. Provided downward of the axial-direction seal cover 6 is an inlet hole (not illustrated) which connects to the interim chamber B housing the primary-side mechanical seal 20 and through which the external liquid 37 flows in from the outside, while provided upward of it is an outlet hole 6d (feed hole) which connects to the interim chamber B housing the secondary-side mechanical seal 30 and through which the external liquid 37 flows out to the outside, and the external liquid 37 keeps the interim chamber B at a desired pressure. Also, the external liquid 37 is circulated by an impeller formed on the sleeve 12.

Next, maintenance of the seal ring 33, etc., is explained.

(Step 1) As a preparation, the liquid or gas 3 in the pump chamber is drained and the external liquid 37 in the interim chamber B is drained from a drain port (not illustrated). With a set plate (not illustrated) engaging with a concave part 13b of the circular sleeve 13a, the set plate is installed to the outer-diameter-side seal cover 7 by a set plate bolt (not illustrated), after which the setscrew 13 and nut 10 are removed and the mechanical seal device 4 is removed from the equipment main body 2.

It should be noted that, by installing the set plate, the outer-diameter-side seal cover 7 is fixed to the sleeve 12 via the circular sleeve 13a and split ring 13c, and the primary-side mechanical seal 20 and secondary-side mechanical seal 30 can now be assembled into a cartridge structure having the same mode for use as that shown in FIG. 1.

(Step 2) The set plate bolt is loosened and the set plate is removed, and the split ring 13c and sleeve collar 14 are removed, as well.

(Step 3) The nut 10 and bolt (not illustrated) are removed, and while holding the outer-diameter-side seal cover 7, the outer-diameter-side seal cover 7, inner-diameter-side seal cover 8 and fixed-side seal assembly 32 are pulled out upward in the axial direction (toward atmosphere A). FIG. 2 shows the state after these have been pulled out.

(Step 4) The coupling bolt 11 is loosened and the outer-diameter-side seal cover 7 is removed from the inner-diameter-side seal cover 8. FIG. 3 shows the state after the seal cover has been removed.

(Step 5) Maintenance of the fixed-side seal assembly 32 is performed, such as repairing the seal ring 33.

(Step 6) Steps 1 to 5 above are performed in the reverse order to restore the original state.

Since the inner-diameter-side seal cover 8 is detachably connected to the outer-diameter-side seal cover 7 as described above, the outer-diameter-side seal cover 7 can be removed from the inner-diameter-side seal cover 8 to which the seal ring 31 is connected. Because of this, the fixed-side seal assembly 32 having the seal ring 33 connected to the inner-diameter-side seal cover 8 via the bellows 35 becomes smaller in outer shape and lighter in weight, resulting in excellent ease of handling the seal ring 33, etc., during maintenance. Furthermore, if a need arises to replace the fixed-side seal assembly 32, the outer-diameter-side seal cover 7 can be removed from the assembly shown in FIG. 2 and this eliminates the need to replace the outer-diameter-side seal cover 7, and because all that is needed is to replace the fixed-side seal assembly 32 and inner-diameter-side seal cover 8, excellent economy is achieved.

Also, the outer-diameter-side seal cover 7 and inner-diameter-side seal cover 8 have no feed hole for external liquid or other fluid, which eliminates the need to elongate the outer-diameter-side seal cover 7 and inner-diameter-side seal cover 8 in the axial direction so that they can be made small/lightweight as a result, and this leads to excellent ease of handling the outer-diameter-side seal cover and inner-diameter-side seal cover when they are removed from the axial-direction seal cover together.

In addition, because the outer-diameter-side seal cover 7 and inner-diameter-side seal cover 8 are connected/arranged by the so-called half-lap joining method, and also because the circular projection 7a of the outer-diameter-side seal cover 7 is sandwiched between the circular projection 8a of the inner-diameter-side seal cover and the head 11b of the coupling bolt 11 fastened to the exterior side of the inner-diameter-side seal cover 8 and thereby fixed in place, the coupling bolt 11 can be fastened to the inner-diameter-side seal cover 8 without causing the projection 7a of the outer-diameter-side seal cover 7 to penetrate through, which allows the inner-diameter-side seal cover 8 to be constituted shorter in the axial direction and lighter. Moreover, because the internal pressure exerted by the external liquid 37 onto the inner-diameter-side seal cover 8 is primarily received by the projection 7a of the outer-diameter-side seal cover 7, the fastening force by the coupling bolt 11 can be low. Furthermore, since the inner-diameter-side seal cover 8 is sandwiched between the outer-diameter-side seal cover 7 and axial-direction seal cover 6 in the axial direction besides being fixed by a connecting member which is the coupling bolt 11, the connecting member 11 to be used can be one of low fastening force.

Furthermore, because the inner-diameter-side seal cover 8 and outer-diameter-side seal cover 7 can be made shorter in the axial direction (made thinner), the axial-direction seal cover 6 can be extended higher (formed longer in the axial direction), which in rotate increases the degree of freedom of selecting the location of the outlet hole 6d in the axial-direction seal cover 6. When a longitudinal pump is used, the outlet hole 6d can be placed even higher to keep gas from collecting above the interim chamber B.

Example 2

The mechanical seal pertaining to Example 2 is explained by referring to FIG. 4 which corresponds to FIG. 2 in Example 1. Example 2 differs from Example 1 in the shapes of the outer-diameter-side seal cover and inner-diameter-side seal cover and their connection structure, and these items different from Example 1 are explained below.

As shown in FIG. 4, an outer-diameter-side seal cover 7' has a circular cutout at the top on the inner diameter side, and also has a circular projection 7a' formed at the bottom which projects toward the inner diameter side. An inner-diameter-side seal cover 8' has a circular cutout at the bottom on the outer diameter side, and also has a circular projection 8a' (flange) formed at the top which projects toward the inner diameter side. When the projection 7a' of the outer-diameter-side seal cover 7' is aligned in position with the cutout in the inner-diameter-side seal cover, the outer-side surface of the outer-diameter-side seal cover 7' becomes roughly flush with that of the inner-diameter-side seal cover 8'. When a gasket 7c' (replacing the gasket 6b in Example 1) is placed between the projection 7a' of the outer-diameter-side seal cover 7' and the cutout in the inner-diameter-side seal cover and a male thread 11a' of a coupling bolt 11' (fixing means) is caused to be screwed to a female thread 7b' of the outer-diameter-side seal cover 7', the projection 8a' is sandwiched between a head 11b' of the coupling bolt 11' and the projection 7a' and thus fixed in place.

Because the outer-diameter-side seal cover 7' and inner-diameter-side seal cover 8' are connected/arranged by the so-called half-lap joining method, and also because the circular projection 8a' of the inner-diameter-side seal cover 8' is sandwiched between the circular projection 7a' of the outer-diameter-side seal cover 7' and the head 11b' of the coupling bolt 11' fastened to the exterior side of the outer-diameter-side seal cover 7' and thereby fixed in place, as described above, the coupling bolt 11' can be fastened to the outer-diameter-side seal cover 7' without causing the projection 8a' of the inner-diameter-side seal cover 8' to penetrate through, which allows the outer-diameter-side seal cover 7' to be constituted shorter in the axial direction and lighter, while also achieving excellent ease of maintenance because the inner-diameter-side seal cover 8' can be removed without removing the outer-diameter-side seal cover 7'.

Example 3

The mechanical seal device pertaining to Example 3 is explained by referring to FIGS. 5 to 7. In the explanations below, the relative directional terms such as "top" and "bottom" refer to those defined in the drawing of FIG. 5 and do not necessarily represent the top and bottom of the mechanical seal device after being installed, while the terms "inner side" and "outer side" refer to the sealed fluid side and atmosphere side of the mechanical seal device, respectively.

A mechanical seal device 104 is of the so-called back-to-back double type, where a primary-side mechanical seal 120 and secondary-side mechanical seal 130 are used to axially seal between a rotating shaft 101 extending in the vertical direction and a seal cover 105 enclosing the rotating shaft 101. A pump impeller housed in an equipment main body 102 is fixed to the bottom of the rotating shaft 101. The seal cover 105 is fixed to the equipment main body 102 by a bolt 109 and nut 110 and encloses the rotating shaft 101 in the axial direction and radial direction.

The seal cover 105 is formed by an axial-direction seal cover 106 which is fixed to the equipment main body 102 with the bolt 109 and nut 110 via a gasket 106a, and an outer-diameter-side seal cover 107 and inner-diameter-side seal cover 108 which are connected to the end of the axial-direction seal cover 106 and seal in the radial direction. These seal covers 106, 107, 108 are formed by stainless steel, aluminum alloy, or other metal.

As shown in FIG. 6, the outer-diameter-side seal cover 107 has a circular cutout at the top on the inner diameter side (end face side on the atmosphere A side), and also has a circular projection 107a formed below the cutout and projecting toward the inner diameter side. The inner-diameter-side seal cover 108 has a circular cutout at the bottom on the outer diameter side, and also has a circular projection 108a (flange) formed above the cutout and projecting toward the outer diameter side, and a counter bore 108d to accommodate a head 111b of a coupling bolt 111 (fixing means) is formed in the circular projection 108a. With a circular gasket 108e placed between the side faces of the projections 107a, 108a, the projection 107a of the outer-diameter-side seal cover 107 is aligned in position with the cutout in the inner-diameter-side seal cover and then the coupling bolt 111 is guided from above through a through hole 108b provided in the projection 108a and through hole in the gasket 108e to cause a male thread 111a of the coupling bolt 111 to be screwed to a female thread 107c of the projection 107a, so that the inner-diameter-side seal cover 108 is fixed to the outer-diameter-side seal cover 107 as a result.

The outer-diameter-side seal cover 107 is fixed to the axial-direction seal cover 106 by fastening a bolt (not illustrated). The outer-diameter-side seal cover 107 and axial-direction seal cover 106 are sealed by a gasket 107d.

A setscrew 113 screwed with the female thread of a circular sleeve 113a fitting to a sleeve 112, so that the tip of the setscrew 113 abuts the outer periphery surface of the rotating shaft 101 and the sleeve 112 does not rotate but remains fixed. The circular sleeve 113a is restrained by a split ring 113c from moving outward in the axial direction. Also, a sleeve collar 114 presses a gasket 114a against the end face of the sleeve 112 to seal along the rotating shaft 101. The primary-side mechanical seal 120 comprises: a mating ring 121 which is closely fitted and fixed to the bottom of a circular projection 112a of the sleeve 112 and rotates with the rotating shaft 101; a fixed-side seal ring 123 that slidably contacts the mating ring 121; a retainer 124 that holds the seal ring 123 in place; a bellows 125 which is welded and fixed to the retainer 124 and adds bias force in the axial direction; and an adapter 126 whose one end is welded and fixed to the bellows 125 and other end is fixed by a bolt 127 to the inner periphery of the axial-direction seal cover 106. It should be noted that the seal ring 123, retainer 124, bellows 125, and adapter 126 constitute a fixed-side seal assembly 122.

The secondary-side mechanical seal 130 comprises: a mating ring 131 which is closely fitted and fixed to the top of the circular projection 112a of the sleeve 112 and rotates with the rotating shaft 101; a fixed-side seal ring 133 that slidably contacts the mating ring 131; a retainer 134 that holds the seal ring 133 in place; a bellows 135 which is welded and fixed to the retainer 134 and adds bias force in the axial direction; and an adapter 136 whose one end is welded and fixed to the bellows 135 and other end is welded and fixed, along its outer periphery, to the inner periphery of the inner-diameter-side seal cover 108. It should be noted that the seal ring 133, retainer 134, bellows 135, and adapter 136 constitute a fixed-side seal assembly 132. In other words, the fixed-side seal assembly 132 is connected to the inner-diameter-side seal cover 108 in a securely following manner.

Also, external liquid 137 is sealed in an interim chamber B between the primary-side mechanical seal 120 and secondary-side mechanical seal 130, filling the chamber to its top. Provided downward of the axial-direction seal cover 106 is an inlet hole 106b (feed hole) which connects to the interim chamber B housing the primary-side mechanical seal 120 and through which the external liquid 137 flows in from the outside, while provided roughly at the center of the outer-diameter-side seal cover 107 in the vertical direction is an outlet hole 107b which connects to the interim chamber B housing the secondary-side mechanical seal 130 and through which the external liquid 137 flows out to the outside, and the external liquid 137 keeps the interim chamber B at a desired pressure. Also, the external liquid 137 is circulated by an impeller 112b provided on the sleeve 112.

Next, maintenance of the seal ring 133, etc., is explained.

(Step 1) As a preparation, a liquid or gas 103 in the pump chamber is drained and the external liquid 137 in the interim chamber B is drained from a drain port (not illustrated). With a set plate (not illustrated) engaging with a concave part 113b of the circular sleeve 113a, the set plate is installed to the outer-diameter-side seal cover 107 by a set plate bolt (not illustrated), after which the setscrew 113 and nut 110 are removed and the mechanical seal device 104 is removed from the equipment main body 102.

It should be noted that, by installing the set plate, the outer-diameter-side seal cover 107 is fixed to the sleeve 112 via the circular sleeve 113a and split ring 113c, and the primary-side mechanical seal 120 and secondary-side mechanical seal 130 can now be assembled into a cartridge structure having the same mode for use as that shown in FIG. 1.

(Step 2) The set plate bolt is loosened and the set plate is removed, and the split ring 113c and sleeve collar 114 are removed, as well.

(Step 3) The coupling bolt 111 is loosened and the outer-diameter-side seal cover 107 is removed from the innerdiameter-side seal cover 108. FIG. 7 shows the state after the seal cover has been removed.

(Step 4) Maintenance of the fixed-side seal assembly 132 is performed, such as repairing the seal ring 133.

(Step 5) The dismantling steps defined in Steps 1 to 4 above are performed in the reverse order to restore the original state.

Since the inner-diameter-side seal cover 108 is detachably connected to the outer-diameter-side seal cover 107 as described above, the outer-diameter-side seal cover 107 can be removed from the inner-diameter-side seal cover 108 to which the seal ring 131 is connected. The fixed-side seal assembly 132 having the seal ring 133 connected to the inner-diameter-side seal cover 108 via the bellows 135 becomes smaller in outer shape and lighter in weight, resulting in excellent ease of handling the seal ring 133, etc., during maintenance. Furthermore, if a need arises to replace the fixed-side seal assembly 132, the outer-diameter-side seal cover 107 can be removed from the assembly shown in FIG. 6 and this eliminates the need to replace the outer-diameter-side seal cover 107, and because all that is needed is to replace the fixed-side seal assembly 132 and inner-diameter-side seal cover 108, excellent economy is achieved.

Also, the inner-diameter-side seal cover 108 has no feed hole for external liquid or other fluid and the outlet hole 107b is provided in the outer-diameter-side seal cover 107 extending to the top, which increases the degree of freedom of selecting the location of the outlet hole 107b. When a longitudinal pump is used, the outlet hole 107b can be placed even higher to keep gas from collecting above the interim chamber B.

Furthermore, because the circular projection 108a of the inner-diameter-side seal cover 108 is provided above (on the atmosphere A side of) the circular projection 107a of the outer-diameter-side seal cover 107, the inner-diameter-side seal cover 108 and fixed-side seal assembly 132 can be removed simply by loosening the coupling bolt 111, without loosening the nut 110 in step 3 above, or specifically with the outer-diameter-side seal cover 107 still fixed to the axial-direction seal cover 106. FIG. 7 shows the state after these have been removed.

The foregoing explained the examples of the present invention using the drawings; however, specific constitutions are not limited to these examples and other modifications and additions are also included in the scope of the present invention so long as they do not deviate from the main points of the present invention.

For example, the foregoing explained a fixed-side seal assembly having a seal ring, retainer, bellows, and adapter; however, any fixed-side seal assembly may be used so long as it has at least a seal ring. In other words, any fixed-side seal assembly may be used so long as a seal ring is connected to its inner-diameter-side seal cover.

In addition, while desirably the outer-diameter-side seal cover 7, 7' or 107 is made of stainless steel known for its excellent rigidity and corrosion resistance, the inner-diameter-side seal cover 8, 8' or 108 can have relatively lower rigidity and therefore it suffices that this seal cover is constituted by a material offering excellent corrosion resistance, such as a resin molding or a metal other than stainless steel with corrosion-resistant coating applied to it.

Also, while the foregoing explained mechanical seal devices of the tandem type and double type, other types of mechanical seal devices are also supported.

DESCRIPTION OF THE SYMBOLS

1 Rotating shaft
2 Equipment main body
4 Mechanical seal device
5 Seal cover
6 Axial-direction seal cover
6c Flushing drain hole (feed hole)
6d Outlet hole (feed hole)
7, 7' Outer-diameter-side seal cover
7a, 7a' Circular projection
8, 8' Inner-diameter-side seal cover
8a, 8a' Circular projection (flange)
11, 11' Coupling bolt (fixing means)
11b, 11b' Head
20 Primary-side mechanical seal
21 Mating ring
22 Fixed-side seal assembly
23 Seal ring
25 Bellows
30 Secondary-side mechanical seal
31 Mating ring
32 Fixed-side seal assembly
33 Seal ring
35 Bellows
101 Rotating shaft
102 Equipment main body
104 Mechanical seal device
105 Seal cover
106 Axial-direction seal cover
106b Inlet hole (feed hole)
107 Outer-diameter-side seal cover
107a Circular projection
108 Inner-diameter-side seal cover
108a Circular projection (flange)
111 Coupling bolt (fixing means)
111b Head
120 Primary-side mechanical seal
121 Mating ring
122 Fixed-side seal assembly
123 Seal ring
125 Bellows
130 Secondary-side mechanical seal
131 Mating ring
132 Fixed-side seal assembly
133 Seal ring
135 Bellows

What is claimed is:

1. A mechanical seal device having a mating ring that rotates with a rotating shaft, as well as a seal ring that slidably contacts the mating ring, so as to seal between the rotating shaft and a seal cover fixed to an equipment main body;
   wherein the seal cover is a three-part split structure comprising at least an inner-diameter-side seal cover, an outer-diameter-side seal cover and an axial-direction seal cover which are detachably connected to each other,
   wherein the outer-diameter-side seal cover is detachably fixed to the axial-direction seal cover by a first fixing device,
   wherein a flange is formed on the inner-diameter-side seal cover, and the inner-diameter-side seal cover is detachably fixed to the outer-diameter-side seal by a second fixing device in a state where the flange is abutting an inner side of the outer-diameter-side seal cover in an axial direction, the second fixing device being provided separately from the first fixing device,
   wherein the seal ring is held by a retainer, the inner-side seal cover being fixed to an adapter by welding, the retainer being fixed to a first end of a bellows by welding, and a second end of the bellows being fixed to the adapter by welding, so that the seal ring is connected to the inner-diameter-side seal cover in a securely following manner, and wherein when the first fixing device is released and when the second fixing device is not released, the seal ring is detached with the inner-diameter-side seal cover from the mechanical seal device by separating the outer-diameter-side seal cover from the axial-direction seal cover.

2. A mechanical seal device according to claim 1, wherein the second fixing device comprises a coupling bolt with head which is installed on the inner-diameter-side seal cover, from an outer side in the axial direction, at a position on an inner diameter side of the outer-diameter-side seal cover, and a part of the head of the coupling bolt contacts the outer-diameter-side seal cover.

3. A mechanical seal device according to claim 1, wherein the inner-diameter-side seal cover is detachable fixed to the outer-diameter-side seal cover such that the flange of the inner-diameter-side seal cover is sandwiched between the outer-diameter-side seal cover and axial-direction seal cover in the axial direction.

4. A mechanical seal device according to claim 2, wherein the inner-diameter-side seal cover is detachably fixed to the outer-diameter-side seal cover such that the flange of the inner-diameter-side seal cover is sandwiched between the outer-diameter-side seal cover and axial-direction seal cover in the axial direction.

5. A mechanical seal device according to claim 1, wherein a feed hole is provided in the axial-direction seal cover through which fluid is fed from outside into a space where the seal ring is placed.

6. A mechanical seal device according to claim 2, wherein a feed hole is provided in the axial-direction seal cover through which fluid is fed from outside into a space where the seal ring is placed.

7. A mechanical seal device according to claim 3, wherein a feed hole is provided in the axial-direction seal cover through which fluid is fed from outside into a space where the seal ring is placed.

* * * * *